United States Patent [19]

Skidmore

[11] 3,963,558

[45] June 15, 1976

[54] APPARATUS AND METHOD FOR PRODUCING SOLID POLYMERIC MATERIAL FROM A DILUTE POLYMER SOLUTION

[75] Inventor: Richard H. Skidmore, Strafford, Pa.

[73] Assignee: W Bar E, Incorporated, Marianna, Fla.

[22] Filed: Dec. 9, 1974

[21] Appl. No.: 530,511

[52] U.S. Cl. .............................. 159/2 E; 425/203; 259/45; 259/68; 259/109; 264/102
[51] Int. Cl.² ...................... B01D 1/28; B01F 7/02; A01J 17/00
[58] Field of Search ..................... 159/2 E, DIG. 10; 259/45, 68, 97, 109; 425/203; 264/101, 102

[56] References Cited
UNITED STATES PATENTS

| | | | |
|---|---|---|---|
| 2,836,851 | 6/1958 | Holt | 159/2 E |
| 3,046,609 | 7/1962 | Bergmeister et al. | 159/2 E |
| 3,067,462 | 12/1962 | Kullgren | 159/2 E |
| 3,082,816 | 3/1963 | Skidmore | 159/2 E X |
| 3,376,603 | 4/1968 | Colombo | 159/2 E |
| 3,535,737 | 10/1970 | Hendry | 159/2 E |
| 3,738,409 | 6/1973 | Skidmore | 159/2 E |
| 3,799,234 | 3/1974 | Skidmore | 159/2 E |

*Primary Examiner*—Jack Sofer

[57] ABSTRACT

Dilute polymer solution (about 5 to 50% by weight of solid polymer) is heated and flashed in a concentrator, is delivered to an extruder at a concentration of about 30 – 80% by weight of solid polymer, further solvent is vaporized and vented off, and the solid polymer material is subjected to counter-current fluid flow in single or multiple stages, with back pressure control at the polymer exit.

13 Claims, 1 Drawing Figure

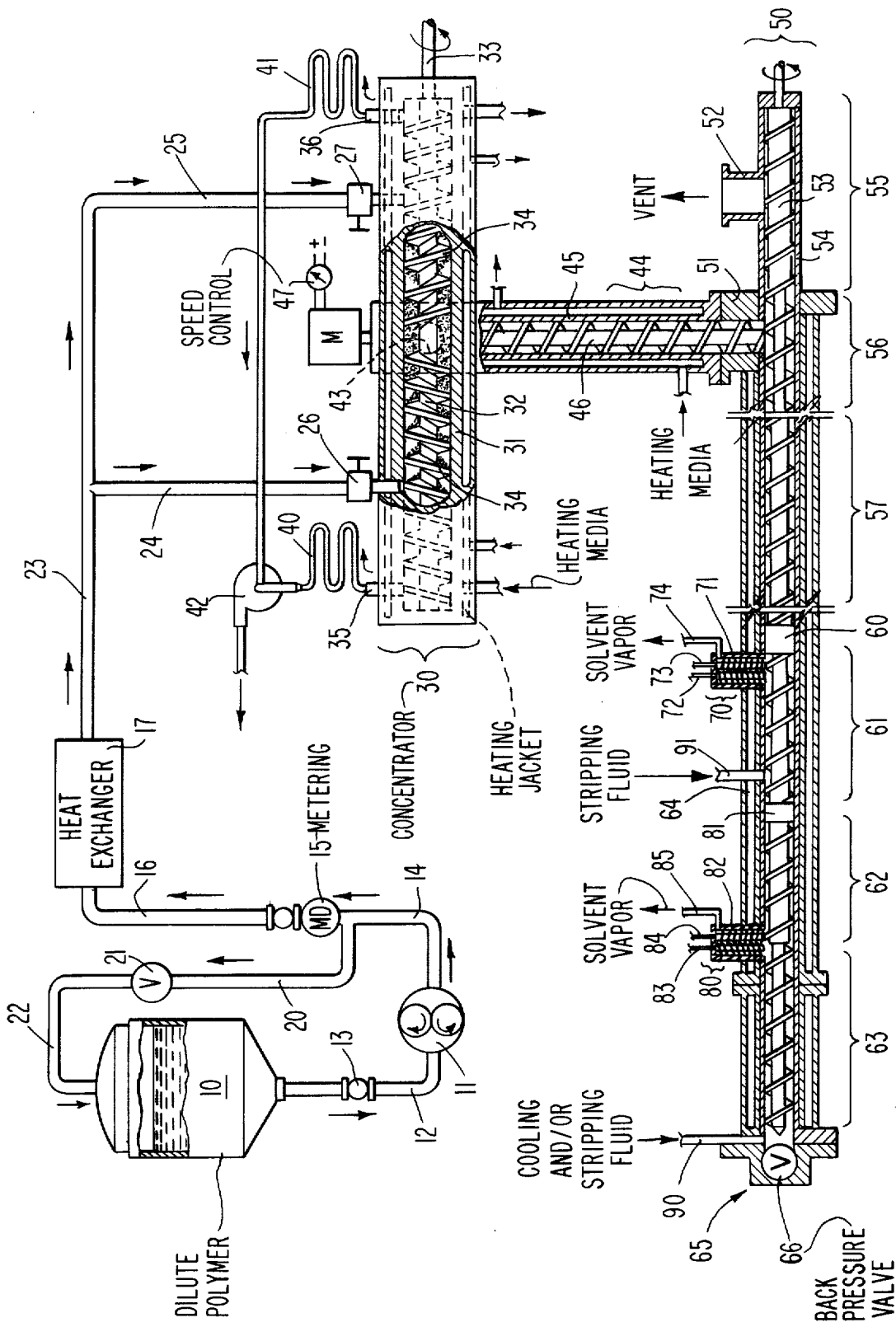

3,963,558

APPARATUS AND METHOD FOR PRODUCING SOLID POLYMERIC MATERIAL FROM A DILUTE POLYMER SOLUTION

BRIEF DESCRIPTION OF THE INVENTION

This invention relates to the preparation of solid polymeric material from a polymer solution, in a single unitary process, with high processing efficiency, and with a highly ecologically beneficial procedure.

In accordance with this invention, a polymer solution is the starting material; the solution is usually quite dilute, containing for example from about 5 – 50% of solids, usually about 25 – 40% of solids, by weight.

The polymers utilized in accordance with this invention may be any polymers that are capable of dissolving in solvents and these include poly-butadiene, butadiene-styrene co-polymers, and other elastomers prepared from styrene monomer, polyethylene, mixed polymers containing styrene components, and any other natural or synthetic polymers which are capable of dissolving in a solvent or in their own monomer, or in mixtures of solvents and monomers. It will be appreciated that the word "polymer", and the expression "polymer solution" will be used throughout in this specification and claims, and these terms are intended to be broadly applied.

In accordance with this invention, the polymer solution is heated in a manner to introduce the maximum permissible thermal energy, and is fed into a flash concentrator, in which substantial quantities of the solvent are flashed off and removed as vapors. The resulting solid polymer, still containing substantial quantities of solvent or monomer, (hereinafter referred to as "solvent"), can be subjected to substantial further heating, and is introduced into an extruder, usually of the elongated rotary-worm type. The extruder is preferably provided with a rear vent for removal of further vapor, and the polymer within the extruder is subjected to counter-current stripping by introducing a counter-current stripping fluid and causing it to flow upstream with respect to the downstream flow of the solid polymer. Further, means are provided at the extruder exit for controlling the back pressure of the solid polymer which is extruded as the final product from the extruder, to control the amount of volatile matter which goes downstream with the polymer, and thereby control the temperature of the polymer.

OBJECTS OF THIS INVENTION

It is an object of this invention to provide a highly efficient and ecologically beneficial process for converting a dilute solution of a polymer into a highly uniform and desirable solid polymeric product.

Another object of this invention is to provide a means for introducing the counter-current flow of water into the devolatilized product, and for introducing a controlled amount of water into the polymeric product.

Still another object of this invention is to provide a procedure of the type referred to, wherein a highly viscous system can be agitated without increasing its temperature to a value which causes polymer degradation.

Still another object of this invention is to provide a means for removal of large quantities of solvent, without causing any harmful temperature rise in the polymer material itself.

Still another object of this invention is to provide a highly flexible procedure for removing large quantities of solvent from heat sensitive materials, with minimum heat history and with control of the polymer temperature independent of the viscosity of the polymer or the energy input.

Other objects and advantages of the invention, including the versatility and adaptability of the manipulative and control elements of the apparatus and method, and the ease with which the apparatus and method may be adapted to the processing of a wide variety of different materials, will become further apparent hereinafter, and in the drawing.

DRAWING

The drawing is a flow diagram illustrating one particular form of apparatus, ideally arranged for practicing this invention.

DETAILED DESCRIPTION OF THE APPARATUS SHOWN IN THE DRAWING

Although specific terms will be used in the following description for the sake of clarity, it will be appreciated that these terms are not intended to limit the scope of the invention, since they are intended to describe only one of the many possible embodiments for utilizing the method and apparatus of this invention.

Turning to the drawing, the number 10 designates a container for a dilute solution of polymer, of the type heretofore described. The polymer is drawn by a pump 11 through line 12 provided with a valve 13, and passes through a line 14 to a metering device 15, and then through line 16 to a heat exchanger 17.

The pipe 20, provided with valve 21, is connected to pipe 22 forming a by-pass which returns to the container 10.

The heat exchanger 17 is provided with any desired external heating means, conventional per se and not shown specifically in the drawing. However, it will be appreciated that the heat exchanger 17 is constructed and arranged to provide the necessary heat input to the solution delivered through the pipe 16.

From the heat exchanger 17 the heated dilute solution flows through the pipe 23 which, as shown, divides into two branches 24, 25, which are in turn connected through control valves 26, 27 into a screw concentrator comprehensively designated by the number 30. The concentrator 30 is shown symmetrically double-ended, but any other form may be used, including a half of single-ended, concentrator or an ordinary evaporation tank or a container in which evaporation may take place.

It will be observed that the concentrator 30 as shown in the drawing is composed of an elongated housing or barrel 31 which is closed at both ends, and which contains an elongated screw 32 which is driven in rotation by a motor (not shown) operating in the direction of the arrow indicated on the shaft 33. The screw 32 is provided with flights 34 which are flighted at the left hand portion of the concentrator 30 to deliver the polymeric material toward the center of the concentrator 30, and are reverse flighted in the right hand portion of the concentrator 30 in order also to deliver the polymeric material toward the center.

The numbers 35, 36 designate vapor vents located adjacent the closed ends of the concentrator 30, such vents being connected to condensing coils 40, 41 for carrying the vapors and/or condensate thereof through a pump 42 to purification, collection or other desired procedures.

The feed valves 26, 27 are located intermediate the vents 35, 36 and the central outlet 43 for the solid polymer.

Means are provided for delivering the concentrated polymer from the concentrator 30 to an extruder comprehensively designated by the number 50. This means, as shown in the drawing, is a screw conveyor 44, although the use of such conveyor 44 is optional; any other means may be utilized, including a pipe, for transporting the concentrated polymer from the outlet 43 to the extruder comprehensively designated 50.

As shown, the screw conveyor 44 is provided with a heating jacket 45, and it contains a screw 46 driven by a motor M having a speed control device 47.

The extruder 50 is provided with an entrance 51 for the concentrated polymer, and a rear vent 52 for any vapor which is liberated from the polymer as it is introduced into the feed port 51. The extruder 50 has a screw 53 rotating within a housing 54, and comprises a shallow screw section 55, a deep screw section 56, a shallower screw section 57, a (cylindrical) restrictor member forming a polymer seal or plug 60, a (tapered) screw section 61, a constant depth shallow screw section 62 and a constant depth deep screw section 63.

It is important that the discharge from the concentrator 30 and the feed to the extruder 50 be a concentrated polymer solution containing about 30 – 80% by weight of polymer and about 70 – 20% by weight of solvent.

It will be appreciated that the extruder 50 is provided with a heating jacket 64 in a manner which is known in the art per se. At its exit end 65 the extruder is provided with a polymer flow back pressure valve 66 which is highly important and advantageous feature of this invention, as will further become apparent hereinafter.

Just downstream of the cylindrical member 60, a vent opening 70 is provided in the extruder housing, forming a vent for solvent vapor. This vent includes a vent housing 71 and a pair of rotatably driven screws 72, 73, which screws are preferably composed of flights that are tangent to each other; the flight of neither screw penetrating into the inter-flight spaces of the other. A vent tube 74 is provided near the top of the vent means 70, which is also referred to herein as a mechanical filter 70.

Another vent means, shown in the drawing as a mechanical filter 80 is provided, downstream of another cylindrical member 81 which forms a polymer seal within the extruder housing. The mechanical filter 80 is also composed of a housing 82, carrying a pair of screws 83, 84, and provided with a vent tube 85, substantially as heretofore described in connection with the mechanical filter 70.

Upstream of the valve 66 is an inlet pipe 90 through which a counter-current stripping medium may be introduced into the polymeric material which is moving downstream within the extruder. Through the inlet pipe 90 any form of counter-current stripping and/or cooling medium may be introduced, such as high pressure hot or cold water, or steam, or hot or cold nitrogen for example. This is a highly important and advantageous feature of this invention, as will further become apparent hereinafter.

The valve 66 may be regulated to control the amount of solvent (if any) which passes downstream along with the polymer. It is desirable, when such solvent is present, to utilize a further extruder zone having at least one solvent vent, downstream of the valve 66, to remove such residual solvent from the polymer.

OPERATION

The operation of the apparatus in accordance with this invention will now become apparent. Beginning at the solution tank 10, the polymer solution is pumped and heated in the heat exchanger 17, to the maximum temperature to which the polymer can be subjected without causing any damage to the polymer itself. The polymer flow divides between the pipes 24, 25 and is fed into both the left and the right side of the double ended concentrator 30. It will be appreciated, as heretofore emphasized, that the concentrator 30 does not need to be double ended, and that in many cases a single ended concentrator is entirely appropriate. However, in the apparatus as shown, the solution that is introduced into the concentrator 30 vaporizes in vaporization chambers provided in both halves of the concentrator 30. One or more ordinary vaporization chambers may be substituted for the concentrator 30.

The vapor vaporizes off through the vents 35, 36 and may be condensed if desired in condensers 40, 41 and pumped off through a pump 42, either as a liquid or a vapor, or as a mixture of the two.

The polymeric material, thus concentrated, is kneaded and worked by the screws 34, 34 toward the center of the concentrator 30, when it is of the extruder type as shown in the drawing, and additional mechanical and thermal energy are introduced into it, as this is taking place. The thermal energy is conveniently introduced through the heating jacket that surrounds the concentrator housing 31.

The resulting hot, plasticized polymer passes out through the exit 43 to the inlet of the (optional) conveyor 44. This conveyor 44 also has a heating jacket 45, through which additional thermal energy may be transferred to the concentrated polymer. The polymer is then introduced into the inlet 51 of the extruder 50, whereupon further solvent vapor may be released from the polymer and may move rearwardly (counter-currently) through the very shallow inter-flight spaces of section 53 at the rear end of the screw, and out through the vent 52. The screw flights in section 53, of course, prevent the polymeric material from passing out through the vent 52, and forward the polymeric material toward the exit end, or front end, of the extruder 50. The deep flights 56 allow the release of further vapor, of course, and further vapor may accordingly move upstream and pass out through the vent 52.

The polymeric material then enters the shallow zone 57 and is applied under pressure against the cylindrical portion 60, forming a pressurized polymer seal within the extruder. The hot, plasticized polymer moves downstream of the seal formed at 60 and vapors are immediately released as the polymer is discharged into the deeper section 61, the deepest flights of which are located immediately adjacent to the cylinder 60. These vapors, which pass out through the mechanical filter 70, sometimes include entrained solids, which are trapped by the rotating screws 72, 73 and which are prevented from leaving the system along with the solvent passing out through the solvent vent tube 74. Another material plug is built up at the cylindrical member 81, and the polymer is forced downstream of the material plug 81 into a (shallow) screw section 62. At this time, the polymeric material may be subjected to a counter-current stripping step, wherein high pressure hot or cold water, or steam, or hot or cold nitrogen for example, having been introduced through the pipe 90, flows upstream in a direction opposite to the direction of flow of the solid polymer, through the constant depth section 63 of the screw in the extruder 50. The stripping and/or cooling material thus contacts the solid polymer intimately, and strips from it further residual solvent, monomer, or any other materials or ingredients that may either be soluble in the counter-current stripping medium, or may be removable under the influence of the counter-current stripping medium. The counter-current stripping medium flows out through the spaces between the screws 83, 84 in the mechanical filter 80, but any solid polymer is caught up by the rotating screws 83, 84 and prevented from leaving the machine.

It is an advantageous feature in accordance with this invention that a valve 66 is provided at the exit end of the extruder. This valve 66 is adjustable, and may be used to adjust the back pressure of the polymer as it is forced out of the extruder as a final product. This feature provides for a highly advantageous control in accordance with this invention. For example, when a counter-current strip is used which involves the use of water or steam, and in which it is desired to allow a certain quantity of water to move downstream with the polymer, the adjustment of the back pressure on the polymer is highly advantageous. The adjustment of the valve is particularly advantageous when the counter-current stripping medium contains water or steam, for example. For some end uses, it is desirable to provide a product having a controlled amount of water in it. Accordingly, by adjusting the back pressure of the valve it is possible to control the amount of water moving downstream with the product.

It is an important and advantageous feature of the counter-current stripping section of this apparatus that it is possible to use a huge volume of water or other counter-current stripping medium, flowing upstream with respect to the polymer. However, if it is desired to permit a smaller controlled amount of water to move downstream with the polymer, this may be done by utilizing the control valve, and this produces a product in which the water comes out of the final product very easily, particularly when a cutting means is utilized in order to cut the product into fine particles.

It will be appreciated that the concentrator may be single ended or double ended as shown, and this is entirely optional.

It will also be appreciated that the transfer conveyor 44 may be used in connection with this invention or may be dispensed with by simply providing any form of interconnection between the outlet 43 and the inlet 51.

However, it is important that the counter-current water strip which may be utilized in accordance with this invention provides viscosity control, allowing the operator to agitate the highly viscous system without increasing its temperature.

With rubber, for example, it is possible to bring the rubber out wet, sending some water off with the final product. With many polymers, also, some of the water can be sent off through the extruder die, but it is usually removed as a further step in making the final product. The apparatus and method of this invention provide great flexibility in this regard. A wet product may be made intentionally by using the fluid in line 90 as a counter-current cooling and/or stripping fluid. By shutting off line 90, the vent 84 then operates as a devolatilizing vent and a bone-dry dense product may be made. Control, utilizing this arrangement, is such that it is possible to introduce a great amount of energy into the product and not have any significant temperature rise. This is highly advantageous for handling a heat sensitive material of any kind. Further, the use of water just before the discharge of the polymer from the extruder cools the polymer where cooling is often needed the most. It is highly advantageous that the counter-current flow medium be introduced into the extruder just upstream of the exit valve 66 heretofore discussed.

It will be appreciated that the overall system in accordance with this invention has an extremely low energy consumption. While some other systems consume as much as 4,000 b.t.u. per pound of polymer, the same polymer can often be produced in accordance with this invention with the use of only 700 – 800 b.t.u. per pound of polymer. The flexibility in accordance with this invention is greatly helpful in utilizing energy only where the use of energy is needed, and avoiding the unnecessary use of energy in many other areas of the apparatus.

It will be appreciated that it is entirely possible and sometimes desirable to use two or more concentrators in series, in order to provide the necessary flow-through rate, particularly in the case where the temperature difference between the maximum temperature the elastomer can tolerate without decomposition, and where the after-flash boiling point is quite small. The number of concentrators that can be used in a cascade arrangement, or in series, is virtually unlimited.

It has been found that highly advantageous results are obtained by utilizing two counter-current stripping stages, in series with each other, with the cylindrical portion 81 providing a material seal between them. This can be achieved, of course, by utilizing the additional introduction pipe 91 which is shown just upstream of the cylindrical portion 81, but spaced downstream of the mechanical filter 70.

Other modifications may of course be made in the apparatus and method according to this invention, and certain features may be used independently of other features. For example, when desired, the pipe 91 may simply be plugged off, in which event the extruder section 61 becomes a single stage devolatilizing section and the extruder stage 63 becomes a single stage counter-current stripping stage. Multiple stage devolatilization may be used, by providing two sections 61, with a material seal between them, a feature of considerable value which is shown per se in the patent to Skidmore U.S. Pat. No. 3,082,816.

Although the valve 66 may be a valve of any type, it is preferably in many cases a pair of concavely arranged orifice plates, adjustable with respect to one another in a manner to restrict the flow of the rubber product, thus regulating its back pressure. One highly advantageous form of such back pressure device is shown and described in the co-pending patent application of Paul H. Rossiter and Richmond S. Parsons, Ser. No. 331,603, filed Feb. 12, 1973, now U.S. Pat. No. 3,874,835 which is a continuation-in-part of their co-pending application Ser. No. 130,586, filed Apr. 2, 1971, now abandoned, and assigned to the assignee hereof.

These concavely arranged orifice plates are highly desirably incorporated into a transversely arranged cutter referred to in the art as a "turbulator" which rapidly and efficiently cuts the polymer product into particles and conveys them efficiently away for further processing, with the aid of a processing fluid which flows in the desired direction to carry the particles quickly away from the area in which the cutters function.

Other modifications may be made, including the use of equivalent elements and process steps in place of those disclosed herein, and various other changes may be made without departing from the spirit and scope of this invention as defined in the appended claims.

I claim:

1. In an apparatus for producing solid polymer from a polymer solution which contains about 5 – 50% by weight of solid polymer in about 50 – 95% by weight of a solvent, the combination which comprises:
   a. means for heating said polymer solution, and means for feeding it under pressure.
   b. a concentrator connected to accept said heated and pressurized solution as a feed solution, including a low pressure chamber portion into which the feed polymer solution is introduced, and a vent means for release of solvent vapor vaporized in said chamber,
   c. an extruder connected to receive the concentrated polymer solution from said concentrator, said concentrated polymer solution having a polymer content of about 30 – 80% by weight and about 70 – 20% by weight of solvent,
   d. vent means on said extruder upstream of said solution receiving connection for venting further solvent vapor from the concentrated polymer feed,
   e. counter-current fluid introducing means positioned downstream of the feed to said extruder and having connecting means for the introduction and flow of fluid counter-current to the movement of said concentrated polymer in said extruder,
   f. means on said extruder for removal of said fluid and of materials stripped from said concentrated polymer by said fluid, at a location upstream of the point of introduction of said counter-current fluid but downstream of the point of introduction of said concentrated polymer, and
   g. means at the extruder exit for controlling the back pressure of the polymer extruded from said extruder.

2. The apparatus defined in claim 1, wherein said means (g) is a valve.

3. The apparatus defined in claim 1, wherein said means (g) is a turbulator.

4. The apparatus defined in claim 1, wherein said means (f) comprises a mechanical filter including a vent outlet housing mounted on said extruder (c) and containing a pair of rotating screws, said screws being driven in rotation in a direction to prevent solids from leaving the system.

5. The apparatus defined in claim 4, wherein the axes of said rotating screws of said mechanical filter are spaced from one another such that the flights of neither screw penetrate into the inter-flight spaces of the other.

6. The apparatus defined in claim 5, wherein the peripheries of said screws are tangent to each other.

7. The apparatus defined in claim 1, wherein said means for introducing said stripping fluid is located immediately upstream of and adjacent to said controlling means (g).

8. The apparatus defined in claim 1, wherein at least two separate counter-current stripping stages are provided, both being downstream of the location of concentrated polymer feed and one being downstream of the other, and wherein means are provided for forming a polymer seal between said stages.

9. The apparatus defined in claim 1, wherein means are provided for forming a polymer seal upstream of said vent means (d).

10. The apparatus defined in claim 1, wherein a transporting means is provided which includes a separately driven screw conveyor arranged transversely of the axis of either or both of said concentrator (b) and extruder (c) and connecting them to each other.

11. The apparatus defined in claim 10, wherein means are provided for introducing energy into said concentrated polymer while it is moving in said transporting means.

12. The apparatus defined in claim 1, wherein said concentrator (b) is horizontally elongated and wherein a pair of polymer solution feed ports are provided in said concentrator, axially spaced apart from one another, wherein respective vents are provided upstream of each said feed port, and wherein a single solid polymer outlet is provided between said feed ports.

13. The apparatus defined in claim 12, wherein means are provided for condensing and collecting said vapor from said vents.

* * * * *